C. L. COFFIN.
METHOD OF ELECTRIC ARC WELDING, HEATING, AND METAL WORKING, AND APPARATUS THEREFOR.
APPLICATION FILED APR. 5, 1916.
1,216,947.
Patented Feb. 20, 1917.
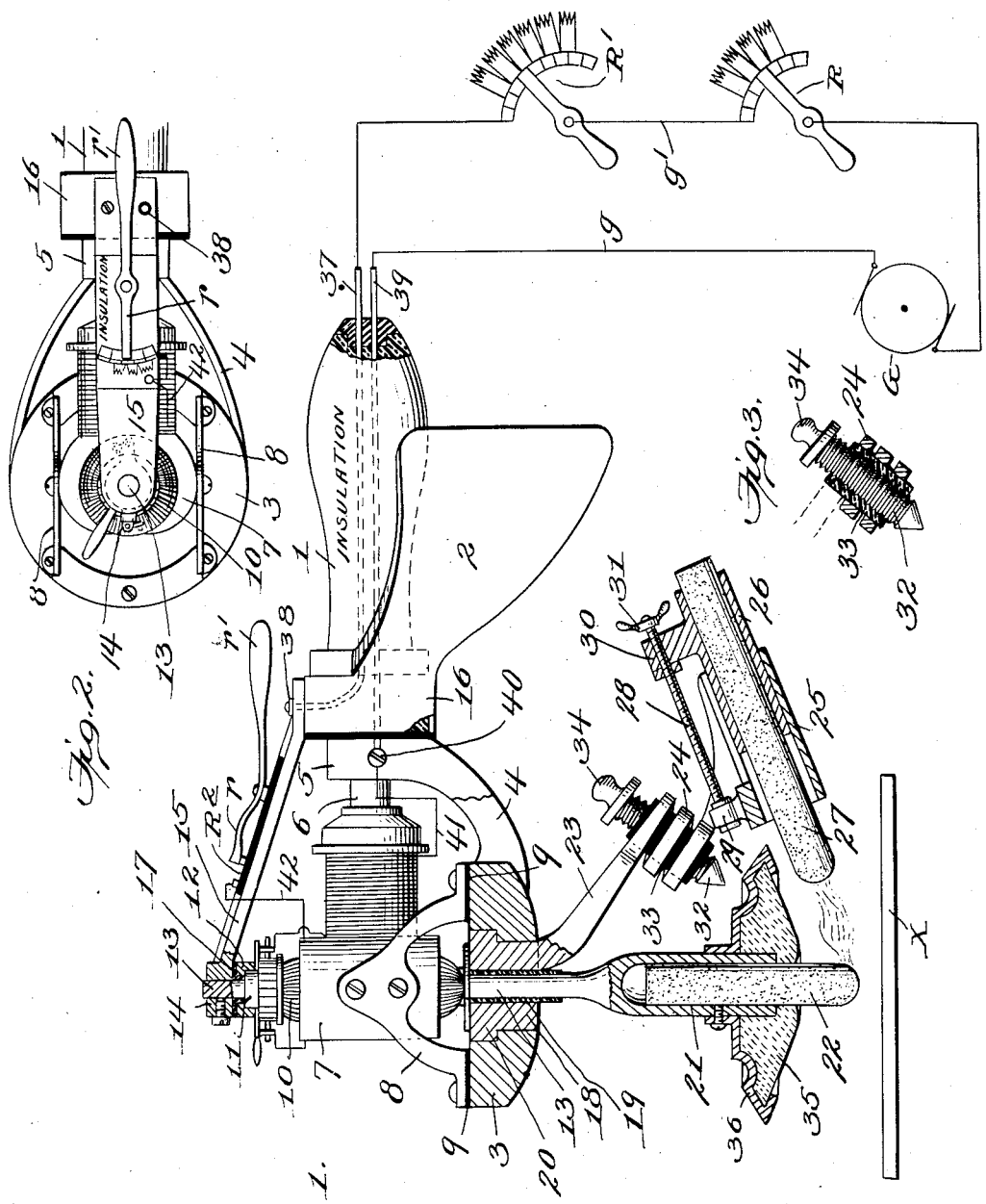

UNITED STATES PATENT OFFICE.

CHARLES L. COFFIN, OF PARKS, GEORGIA, ASSIGNOR TO ELECTRIC METAL WORKING COMPANY, OF DETROIT, MICHIGAN, A CORPORATION OF MICHIGAN.

METHOD OF ELECTRIC-ARC WELDING, HEATING, AND METAL-WORKING, AND APPARATUS THEREFOR.

1,216,947. Specification of Letters Patent. Patented Feb. 20, 1917.

Application filed April 5, 1916. Serial No. 89,128.

*To all whom it may concern:*

Be it known that I, CHARLES L. COFFIN, a citizen of the United States, residing at Parks, in the county of White and State of Georgia, have invented new and useful Improvements in Methods of Electric-Arc Welding, Heating, and Metal-Working, and Apparatus Therefor, of which the following is a specification.

My present invention relates to improvements in the art of welding, heating, or otherwise treating metals by means of the electric arc.

The primary object of the invention is to so utilize the heat of the electric arc for welding, heating, or other treatment, that the metal or material to be heated is not included in the electric circuit as an electrode for the arc, and to this end the arc is maintained between two electrodes which are extraneous but in proximity to the metal or material under treatment, the distance between the metal or material under treatment and the arc being variable at will and the heat of the arc being distributed evenly and over a relatively large area by imparting a traversing movement to the arc, this being effected preferably by causing one of the electrodes to move or revolve about the other electrode, the arc in consequence having a corresponding revolving motion.

Another object is to deflect and control the arc, as conditions may require, by subjecting the arc to the influence of a magnetic field.

A further object of the invention is to augment the heating effect of the arc and assist in stabilizing the revolving or moving arc by providing a refractory medium in proximity to the arc where it will become heated by the arc and will radiate heat to the metal or material under treatment.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 is a side elevation, partly in section, showing an apparatus constructed in accordance with one embodiment of the present invention and capable of use in performing the method of the present invention.

Fig. 2 is a top plan view of a portion of the apparatus as shown in Fig. 1, and

Fig. 3 is a detail sectional view of the means employed for producing a magnetic field to influence the arc.

Similar parts are designated by the same reference characters in the several views.

The present invention provides a method of and an apparatus for welding, heating, or otherwise treating metals or materials by the electric arc. It may be used for various purposes where the heating of metal or material by the electric arc is desirable or necessary. The method is capable of being performed with the aid of apparatus of different kinds, although it is preferable to perform the method by the aid of a portable or hand tool, as shown in the drawing and hereinafter described in detail. While the hand tool or apparatus shown in the drawing is generally preferable, it is to be understood that the invention is not restricted to a tool or apparatus of this particular construction, as equivalent constructions within the scope of the claims or other apparatus or tools suitable for the purpose may be used in carrying the invention into practice.

As shown, the apparatus, in the form of a portable or hand tool, comprises an insulated handle 1 of suitable form and construction, the handle being preferably provided with a guard 2 to protect the hand of the operator grasping the handle from the heat of the arc while the tool is, in operation. A bracket 3 is suitably attached to the handle and serves to support the electrodes and their related parts. As shown, the bracket 3 is connected by arms 4 to a collar 5, the latter being fixed to the handle. The bracket 3, together with its connecting arms 4 and the collar 5, is preferably of metal or electrical conducting material. Above the bracket 3 is mounted a motor or equivalent device for imparting a revolving motion to one of the electrodes relatively to the other electrode, as will be hereinafter described. An electric motor is preferably used, that shown having a field magnet of horseshoe form, the middle of the field magnet being supported on or attached to the handle by a stud 6, which latter is attached to the intermediate portion of the field magnet and enters a socket formed in the adjacent end of the handle, while the pole pieces 7 of the motor are supported above the bracket 3 by the smaller brackets 8. Preferably, the legs of the brackets 8 are insulated from the bracket 3, insulation 9 being shown in the present instance as interposed between the legs of these brackets 8 and the upper side of the bracket 3. The armature 10 of the motor, together with the commutator and brushes thereof, is shown conventionally and these parts may be of usual construction. The shaft 11 of the armature, however, is mounted at its upper end in a bearing 12, and this bearing is insulated from the adjacent parts of the tool. In the present instance, the armature shaft 11 is hollow, and a stem 13 extends loosely through the armature shaft and is secured at its upper end, at different axial adjustments, by a clamp 14 carried by a bracket arm 15, the latter being preferably of metal or electrical conducting material and extending from a metal or electrical conducting sleeve 16, which latter surrounds or is mounted on the handle but is insulated therefrom. The bearing 12 for the upper end of the armature shaft of the motor is insulated from the stem 13 and from the bracket arm 15 by a bushing 17 of insulating material, which bushing is interposed between the bearing and the stem and bracket arm. The lower end of the armature shaft has a sleeve-like extension 18 which telescopes over the stem 13 and is insulated therefrom by an insulating sleeve or bushing 19. This sleeve-like extension 18 of the armature shaft is fixed in a collar 20, the latter being journaled to revolve in the bracket 3 with and about the armature shaft as an axis. The stem 13 serves to support and to conduct current to one of the electrodes. For this purpose it is provided at its lower end with a chamber or socket 21 to receive a carbon or other suitable electrode 22, the latter being adjustable longitudinally in the socket and suitably clamped or held therein, and the revoluble collar 20 carries or supports the other electrode. In the present instance, an arm 23 extends downwardly and outwardly from the under side of the revoluble collar 20, it is convoluted at a suitable point to form a coil 24, and its extremity forms a socket 25 to receive a holder 26 for the second electrode 27. The electrode holder 26 is movable in the socket 25 on a line leading to the end or point of the electrode 22, or substantially so, in order to provide the necessary movements and adjustments between the electrodes. To effect these movements and adjustments, a screw 28 is shown, it having one end journaled in a bearing 29 on the socket 25, while the screw is threaded in the part 30 of the holder 26. A handle 31 on the screw serves to operate it. The coil 24 through which current passes to the electrode 27 produces a magnetic field which may be used alone as means to deflect or influence the arc passing between the electrodes. However, in order to intensify this influence and to provide for varying the intensity thereof, it is preferable to provide the coil with a magnetic core 32 which is adjustable in a direction toward and from the arc gap. As shown, a bushing 33 of insulating material is fitted longitudinally in the coil, and the core 32 is threaded into this insulating bushing, the upper end of the core having a handle 34 to provide for rotation thereof to adjust the same axially of the coil or in a direction to vary the distance of the core from the arc gap.

According to the present invention, it is preferable to heat the metal or other part to be treated not only by heat direct from the arc but also by radiated heat. As shown, a refractory medium is provided which acts to radiate or reflect heat from that side of the arc remote from the metal to the metal, and this refractory medium is also utilized to stabilize the arc. As shown, a body of refractory material 35 is provided about the lower end of the stem 13 which carries the electrode 22, this refractory material being supported on the stem 13, for example, by a shell or casing 36 which is preferably of non-magnetic material. The refractory material and its inclosing casing are preferably circular and concentric with the axis of the electrode 22 in order to permit the electrode 27 and the parts related thereto to revolve without obstruction. As shown, X represents diagrammatically a piece of metal in position relatively to the electrodes for treatment by the arc passing between the electrodes.

Current may be conducted to the respective electrodes in any suitable way. As shown, current is conducted to the electrode 22 through its conducting stem 13, the bracket arm 15, and the conducting sleeve 16, a conductor 37 leading through the handle and forming a connection with the bracket arm 15 at the point 38, while current is conducted to the electrode 27 through its holder 26, the socket 25, the coil 24, arm 23, and revoluble collar 20, current being conducted to this collar through the bracket 3, arms 4, and collar 5. A conductor 39 extends in the present instance through the insulated handle and forms a connection with the collar 5, at 40. Current may be supplied from any suitable source. As shown, G represents diagrammatically a generator, one of the terminals of which is connected by the wire $g$ to the conductor 39, while the other terminal thereof is connected by the wire $g'$ to the conductor 37. The wire $g'$ is shown as having in series therewith a starting resistance for the arc designated R and a controlling resistance for the arc designated R', these two resistances being variable at will and being shown conventionally as rheostats. Means is also provided for starting and controlling the operation of the motor carried by the tool. In the present instance, a starting and controlling rheostat and switch $R^2$ is provided on the bracket arm 15, the switch arm $r$ of this rheostat having a thumb-piece $r'$ which is arranged in such a position relatively to the handle 1 that it may be easily manipulated by the thumb of the hand which grasps the handle, whereby the starting, the speed of running and the stopping of the motor may be easily controlled at the will of the operator. The motor is connected in the circuit, in shunt with the electrodes, by the wire 41 connected to the terminal 40 and the wire 42 connected to the end contact of the rheostat $R^2$, the switch arm $r$ of the latter being connected to the current conducting bracket arm 15.

The method, carried out by the aid of a tool such as that shown and described herein, may be described as follows:—With the conductors 37 and 38 for the electrodes 22 and 27 respectively connected by the wires $g$ and $g'$ to the generator or source of electric current supply G, and all the resistance of the rheostats R and R' in the circuit, the electrode 27 is advanced by manual operation of the screw 28 until it makes contact with the electrode 22, the circuit being then closed, but as all the resistance is then in the circuit, an excessive flow of current is avoided. The electrode 27 is then slowly retracted or drawn away from the electrode 22, thereby striking and drawing the arc. As the length of the arc increases by reason of the retraction of the electrode 27, the resistance R is gradually cut out of the circuit by manipulation of the hand switch of this rheostat, the reduction of this resistance being continued until the arc is of the volume and length desired. The controlling resistance R' remains in circuit but it may be varied to suit requirements of the work.

As the arc is now well established between the electrodes, the motor may be started, this being effected by manipulation of the switch or starting handle $r'$ by the thumb of the operator while grasping the handle of the tool, the speed of the motor being varied at will by setting the switch handle $r'$ in different positions. Rotation of the armature shaft of the motor causes the electrode 27 to revolve about the electrode 22, and in consequence it causes a corresponding movement of the arc, and as the tool is brought into close proximity to the material X under treatment, the same is heated by the arc and the heat from the arc is spread or distributed uniformly over a relatively large area of the material. The refractory medium or shield 35 also becomes heated by the arc, and this heat is radiated or reflected by the refractory medium onto the material under treatment, thereby augmenting the direct heating action of the arc. This refractory medium also heats uniformly the zone in which the arc travels, whereby the moving arc is stabilized.

The current of the arc traverses the coil 24, the coil being in circuit with the electrodes, the coil producing a magnetic field which would of itself have an influence upon the arc, tending to bend or deflect the arc toward the metal or part to be heated. However, in order to intensify the influence of this coil upon the arc and also to enable the force of this influence to be increased or diminished as conditions may require, it is preferable to provide the coil with the axially adjustable magnetic core, as hereinbefore described, and by adjusting this core a greater or less deflection of the arc in a direction toward or from the metal or part under treatment may be produced as desired. By this arrangement, the traveling arc is subjected to a uniform field of force which force travels synchronously with the arc. This feature of the invention enables the arc to be deflected toward the metal or part under treatment by suitably adjusting the strength of this magnetic field, in those cases where it is not advisable to move the tool nearer to the surface of the part under treatment, as in the use of a stationary tool, and it also enables the arc to be adjusted so as to operate at a greater distance from the surface of the metal or part under treatment.

The refractory medium or shield is not indispensable, although it is preferable to use it in view of its two-fold function and advantage of reflecting heat from the arc onto the surface under treatment and of stabilizing the moving arc. This shield is not necessarily fixed in relation to the electrode 22, as it may be carried by the traveling electrode 27, and in the latter case it may be shaped so as to protect the moving arc from air currents and so act further to stabilize the arc.

It will be readily understood that the present invention is applicable not only to the welding or heating of metals or other materials, but is applicable generally to various operations requiring a relatively local heating such, for example, as hardening processes and analogous operations.

I claim as my invention:—

1. The method of electric arc welding, heating and metal working, consisting in subjecting the material to the heating effect of an electric arc while such material is not in circuit with the arc and while the arc is in close proximity to the material, and moving the arc and one electrode together with a moving magnetic field, in relation to the other electrode.

2. The method of electric arc welding, heating and metal working by subjecting the material to the heating effect of an electric arc while such material is not in circuit with the arc, which consists in maintaining an electric arc between two electrodes while the latter are in close proximity to such material, and moving one of the electrodes with relation to the other electrode whereby the arc acquires a line of travel with relation to the material and simultaneously subjecting the moving arc to a magnetic field, which field is movable with the arc.

3. The method of electric arc welding, heating and metal working by subjecting the material to the heating effect of an electric arc while such material is not in circuit with the arc as an electrode of the arc, which consists in providing an arc between two electrodes in proximity to the material, and moving the arc and one electrode simultaneously with relation to the other electrode and the material and in unison with a moving magnetic field.

4. The method of electric arc welding, heating and metal working by subjecting the material to the heating effect of an electric arc, which consists in maintaining an electric arc between two electrodes in proximity to such material, and giving the arc a line of travel simultaneously with relation to the material and one electrode, by moving the other electrode with relation to the first electrode and the material and subjecting said arc to a magnetic field moving synchronously therewith.

5. The method of electric arc welding, heating and metal working by subjecting the material to the heating effect of an electric arc, which consists in providing an arc between two electrodes in proximity to the material, and moving the arc and one electrode, simultaneously with relation to the other electrode, in a moving field of uniform magnetic intensity.

6. In an apparatus for arc welding, heating and metal working, the combination of two electrodes in proximity to the material to be heated, means for maintaining an arc between the two electrodes, means for regulating the arc, means for moving one of the electrodes and the arc with relation to the other electrode, and means for varying the speed of the moving electrode.

7. In apparatus for electric arc welding, heating and metal working, the combination of two electrodes adapted to be positioned in proximity to the material to be heated, means for maintaining an electric arc between the two electrodes, means for moving one of the electrodes with relation to the other electrode, whereby the arc acquires a line of travel with relation to the material, means for regulating the arc, and means for establishing and moving a magnetic field synchronously with the moving arc.

8. In apparatus for electric arc welding, heating and metal working, the combination of two electrodes adapted to be positioned in proximity to the material to be heated, means for maintaining an electric arc between the two electrodes, means for moving one of the electrodes relatively to the other electrode in such manner as to give the arc a line of travel in relation to the other electrode and the material, means for regulating the arc, means for varying the speed of the moving electrode, and a refractory body for radiating the heat of the arc.

9. In apparatus for arc welding, heating and metal working, the combination of two electrodes adapted to be placed in proximity to the material to be heated, a source of electric energy for producing an arc between the two electrodes, means for regulating the arc, means for moving one of the electrodes relatively to the other, means for varying the speed of the moving electrode, and means for magnetically deflecting the arc.

10. In apparatus for electric arc welding, heating and metal working, the combination of a source of electric energy, two electrodes connected thereto and adapted to maintain an electric arc between them, means for regulating the arc, means for moving one of the electrodes with relation to the other electrode, means for varying the speed of the moving electrode, means for deflecting the arc, and a refractory body for stabilizing the moving arc.

11. In apparatus for electric arc welding, heating and metal working, the combination of a source of electric energy, two electrodes connected to the source of electric energy and adapted to maintain an arc between them, means for regulating the arc, means for moving one of the electrodes about the other, means for varying the speed of the moving electrode, and means for adjusting the electrodes axially and radially with relation to each other.

12. In apparatus for electric arc welding, heating and metal working, the combination of a source of electric energy, two electrodes connected thereto and adapted to maintain an electric arc between them, means for regulating the arc, means for moving the arc with relation to one of the electrodes and the material to be heated, means for varying the speed of the moving arc, and a current controlling device for the arc.

13. In apparatus for electric arc welding, heating and metal working, the combination of a source of electric energy, two electrodes connected thereto and adapted to maintain an electric arc between them, means for regulating the arc, a current controlling device for the arc, means for moving one of the electrodes and the arc relatively to the other electrode, means for varying the speed of the moving arc, and a refractory shield for stabilizing the arc.

14. In apparatus for electric arc welding, heating and metal working, the combination of a source of electric energy, two electrodes connected to the source of electric energy and adapted to maintain an electric arc between them, means for regulating the arc, a current control device in circuit with the arc, means for simultaneously moving one of the electrodes and the arc with relation to the other electrode and the material, means for varying the speed of the moving arc, and a refractory body for radiating the heat of the arc.

15. In apparatus for electric arc welding, heating and metal working, the combination of a source of electric energy, electrodes connected thereto and adapted to maintain an electric arc between them, means for regulating the arc, a current control device in circuit with the arc, means for simultaneously moving one electrode and the arc with relation to the other electrode and the material, means for magnetically deflecting the arc, means for varying the intensity of the deflecting magnetic field and means for moving the magnetic field synchronously with the moving arc.

16. In apparatus for electric arc welding, heating and metal working, the combination of a source of electric energy, two electrodes connected thereto and adapted to maintain an electric arc between them, means for regulating and controlling the arc, means for simultaneously moving one electrode and the arc with relation to the other electrode and the material, and means for subjecting the arc to a moving magnetic field.

17. In apparatus for electric arc welding, heating and metal working, the combination of a source of electric energy, two electrodes connected thereto and adapted to maintain an electric arc between them, means for regulating and controlling the arc, means for simultaneously moving one electrode and the arc with relation to the other electrode, and means for moving a magnetic field synchronously with the moving electrode.

18. In apparatus for electric arc welding, heating and metal working, the combination of a source of electric energy, two electrodes connected thereto and adapted to maintain an electric arc between them, means for simultaneously moving one electrode and the arc with relation to the other electrode, means for subjecting the arc to a moving magnetic field of uniform intensity, and means for varying the speed of the moving magnetic field.

19. An arc welding and heating apparatus comprising two electrodes insulated from each other and adapted to be connected to a source of electric energy, an insulated holder for the same, means for establishing an arc between the two electrodes, and means for revolving one of the electrodes about the other in a magnetic field of force moving synchronously with said electrode.

20. An arc welding and heating apparatus comprising two electrodes adapted to be connected to a source of electric energy and insulated from each other, an insulated support carrying said electrodes, means for establishing an arc between the two electrodes, means for moving one electrode about the other, and means for moving a magnetic field of force synchronously with the moving electrode.

21. An arc welding and heating apparatus comprising an insulated holder, two electrodes carried by the holder, said electrodes being insulated from each other and adapted to be connected to a source of electric energy, means for establishing an arc between the two electrodes, and means for moving one of the electrodes about the other with means for varying the speed of the moving electrode.

22. An arc welding and heating apparatus comprising a support carrying two electrodes having means for connecting them to a source of electric energy, means for establishing an arc between the two electrodes, means for regulating the arc, means for moving one electrode about the other at variable speeds, means for subjecting the arc to magnetic influence, means for varying the intensity of the magnetic field, and means for moving the magnetic field synchronously with the moving electrode.

23. An arc welding and heating apparatus comprising two electrodes adapted to be connected to a source of electric energy, an insulated support carrying the electrodes, means for adjusting the electrodes axially and radially with relation to each other, means for establishing an arc between the electrodes, means for regulating the arc, means for moving one of the electrodes about the other, and means for subjecting the arc to magnetic influence in a magnetic field moving synchronously with said moving electrode.

24. An arc welding and heating apparatus comprising two electrodes adapted to be connected to a source of electric energy, a support carrying the electrodes, means for adjusting the electrodes with relation to each other, means for stabilizing an arc between the electrodes, means for regulating the arc, means for moving one electrode about the other, a refractory body for radiating the heat of the arc and stabilizing the moving arc, and means for varying the speed of the moving electrode.

25. An arc welding and heating apparatus comprising two electrodes adapted to be connected to a source of electric energy, a support carrying the electrodes, means for adjusting the electrodes with relation to each other, means for establishing an arc between the electrodes, a movable electrode holder having a coiled conductor formed integral therewith, and means for moving one electrode about the other.

26. An arc welding and heating apparatus comprising two electrodes adapted to be connected to a source of electric energy, a support carrying the electrodes, means for adjusting the electrodes with relation to each other, means for establishing an arc between said electrodes, means for regulating said arc, means for moving one electrode about the other, a magnetic field adapted to influence the arc between said electrodes, and means for moving said magnetic field synchronously with the moving electrode.

27. An arc welding and heating apparatus comprising two electrodes adapted to be connected to a source of electric energy, a support carrying the electrodes, means for adjusting the electrodes with relation to each other, means for establishing an arc between the electrodes, means for regulating said arc, means for moving one electrode about the other, a magnetic field adapted to influence the arc between said electrodes, means for moving said magnetic field synchronously with the moving electrode, and means for varying the speed of the moving electrode.

28. An arc welding and heating apparatus comprising two electrodes adapted to be connected to a source of electric energy, a support carrying the electrodes, means for adjusting the electrodes with relation to each other, means for establishing an arc between the electrodes, means for regulating said arc, means for moving one electrode about the other, a magnetic field adapted to influence the arc between said electrodes, means for moving said magnetic field synchronously with the moving electrode, a refractory body for radiating the heat of the arc and stabilizing the moving arc, and means for varying the speed of the moving electrode.

29. An arc welding and heating apparatus comprising two electrodes adapted to be connected to a source of electric energy, a support carrying the electrodes, means for adjusting the electrodes with relation to each other, means for establishing an arc between the electrodes, a movable electrode holder having a coiled conductor formed integral therewith adapted to carry the current of the arc, producing a magnetic field thereby, means for moving one electrode about the other, and means for varying the speed of the moving electrode.

30. An arc welding and heating apparatus comprising two electrodes adapted to be connected to a source of electric energy, a support carrying said electrodes, means for adjusting the electrodes with relation to each other, means for establishing an arc between the electrodes, a movable electrode holder having a coiled conductor formed integral therewith adapted to carry the current of the arc, a core of magnetic material adjustable axially within said coiled conductor, means for moving one electrode about the other, and means for varying the speed of the moving electrode.

31. An arc welding and heating apparatus comprising two electrodes adapted to be connected to a source of electric energy, a support carrying the electrodes, means for adjusting the electrodes axially and radially with relation to each other, means for establishing an arc between the electrodes, means for regulating the arc, means for moving one electrode and the arc about the other electrode, and a refractory body circumferentially and radially surrounding the fixed electrode adjacent to its arcing end and adapted to radiate the heat of the arc and to stabilize the moving arc.

In testimony whereof I have hereunto set my hand in presence of two subscribing witnesses.

CHARLES L. COFFIN.

Witnesses:
THOS. H. UNDERWOOD,
J. B. R. BARRETT.